US008717162B2

(12) United States Patent
Sundholm (10) Patent No.: US 8,717,162 B2
(45) Date of Patent: May 6, 2014

(54) METHOD, SYSTEM AND DEVICE FOR SIGNALING, GUIDING AND ALERTING (75) Inventor: Göran Sundholm, Tuusula (FI)

(73) Assignee: Marimils OY, Vantaa (FI)

(*) Notice: Subject to any disclaimer, the term of this patent is extended or adjusted under 35 U.S.C. 154(b) by 660 days.

(21) Appl. No.: 12/999,882

(22) PCT Filed: Jun. 4, 2009

(86) PCT No.: PCT/FI2009/050476
§ 371 (c)(1),
(2), (4) Date: Dec. 17, 2010

(87) PCT Pub. No.: WO2009/153393
PCT Pub. Date: Dec. 23, 2009

(65) Prior Publication Data
US 2011/0089869 A1 Apr. 21, 2011

(30) Foreign Application Priority Data
Jun. 19, 2008 (FI) .................. 20085621

(51) Int. Cl.
G08B 25/00 (2006.01)
H05B 37/00 (2006.01)

(52) U.S. Cl.
USPC ...... 340/524; 340/286.05; 340/332; 340/577; 340/628; 315/120; 315/132; 315/185 R; 315/323

(58) Field of Classification Search
USPC .......... 315/120, 132, 185 R, 186, 193, 200 A, 315/32; 340/332, 286.05, 524, 577, 628, 340/693.6
See application file for complete search history.

(56) References Cited

U.S. PATENT DOCUMENTS

| 4,347,499 | A | 8/1982 | Burkman, Sr. et al. |
| 5,815,068 | A * | 9/1998 | Vadseth ........................ 340/332 |
| 6,249,221 | B1 * | 6/2001 | Reed ......................... 340/539.14 |
| 7,026,768 | B1 * | 4/2006 | Ruiz ......................... 315/185 R |
| 7,255,454 | B2 * | 8/2007 | Peterson ...................... 362/147 |
| 7,800,511 | B1 * | 9/2010 | Hutchison et al. ......... 340/691.1 |

(Continued)

FOREIGN PATENT DOCUMENTS

| GB | 2 215 105 A | 9/1989 |
| WO | WO 95/19202 A1 | 7/1995 |

OTHER PUBLICATIONS

Finnish International Search Report for 20085621 dated Oct. 28, 2008.

Primary Examiner — Douglas W Owens
Assistant Examiner — Thai Pham
(74) Attorney, Agent, or Firm — Birch, Stewart, Kolasch & Birch, LLP (57) ABSTRACT A method for controlling guiding, signal or alert lights, particularly signal lights for an emergency escape route in a fire situation, in which method there are controlled sequentially arranged light sources, such as LED light sources. In the method, in the first step the sequentially arranged light sources (40), which are most advantageously arranged as a light source string (4) or at least as part thereof, are activated, on the basis of a signal received from a fire detector (3), to be switched to a first mode, in which first mode the sequentially arranged light sources are used for indicating the direction of an escape route, and/or to a second mode, where the light sources (40) are switched to emit continuous light. The invention also relates to a system and a device.

21 Claims, 10 Drawing Sheets (56) References Cited

U.S. PATENT DOCUMENTS

| | | |
|---|---|---|
| 2002/0057204 A1 | 5/2002 | Bligh |
| 2004/0075572 A1 | 4/2004 | Buschmann et al. |
| 2005/0286247 A1 | 12/2005 | Peterson |
| 2006/0071802 A1 | 4/2006 | Right et al. |
| 2007/0152808 A1 | 7/2007 | LaCasse |

* cited by examiner

Typical MILS stripe length = detection spacing = max 11 m

Dynamic Guiding ■ ─ ─ ─ ─ ➔

Static Guiding ──────

○ Fire Detector with Smoke and Heat detection

● Fire Detection Smoke alarm

[●] Fire Detection Heat alarm

FIG 3

Typical MILS stripe length = detection spacing = max 11 m

Dynamic Guiding ▪ ─ ▪ ─ ▪ →

Static Guiding ───────

○ Fire Detector with Smoke and Heat detection

● Fire Detection Smoke alarm

[●] Fire Detection Heat alarm

FIG 4

Typical MILS stripe length = detection spacing = max 11 m

Dynamic Guiding ▪ ▪ ▪ ▪ ▪ ➤

Static Guiding ―――――

○ Fire Detector with Smoke and Heat detection

● Fire Detection Smoke alarm

⊡ Fire Detection Heat alarm

Typical MILS stripe length = detection spacing = max 11 m

Dynamic Guiding ▪ ▪ ▪ ▪ ▪ ➤

Static Guiding ▬▬▬▬▬▬

○ Fire Detector with Smoke and Heat detection

● Fire Detection Smoke alarm

⊙ Fire Detection Heat alarm

FIG 8

Typical MILS stripe length = detection spacing = max 11 m

Dynamic Guiding ▪ ▪ ▪ ▪ ▪ ➔

Static Guiding ▬▬▬▬▬

○ Fire Detector with Smoke and Heat detection

● Fire Detection Smoke alarm

◉ Fire Detection Heat alarm

METHOD, SYSTEM AND DEVICE FOR SIGNALING, GUIDING AND ALERTING

CROSS-REFERENCE TO RELATED APPLICATION

The present application claims priority under 35 U.S.C. §119 to PCT Application No. PCT/FI2009/050476 filed Jun. 4, 2008, and Finnish Patent Application No. 20085621, filed Jun. 19, 2008.

BACKGROUND OF THE INVENTION

1. Field of the Invention

The invention relates to a system and a method for controlling guiding, signal or alert lights, particularly the signal lights of an emergency escape route in case of fire, in which method there are controlled light sources, such as LED light sources, arranged in succession.

The invention also relates to a device in a signaling, guiding or alert light system, particularly in a signal light system for emergency escape routes, said device comprising sequentially arranged light sources, such as LED light sources.

In general, the invention relates to systems for signaling, guiding and alerting people, in which systems people are signaled, guided and alerted by means of light sources, particularly light sources arranged in succession, for example in a string configuration.

2. Description of Background Art

There are known various systems for guiding people in hazardous situations, for instance in case of fire, to the emergency escape routes of buildings or vessels. Among these systems, let us point out illumination arrangements of emergency escape routes, or emergency escape routes that are marked in some other way, for example by reflective paint or tape.

There are known signal lights where the light sources are fastened in succession in a string-like configuration. The light sources in the string are arranged to be switched on in a hazardous situation and to illuminate the escape route. In many targets of usage, such as hotels or passenger ships, there are defined escape routes for emergency situations, and people should follow these routes in case of an evacuation. However, people do not always behave in a controlled way in emergency situations, and they do not follow the predetermined escape routes. There can be many reasons for this. People do not necessarily observe the possible emergency escape routes and the markings pointing to said routes. Moreover, in emergency situations people tend to use routes that are already familiar. On the other hand, in case of a fire, the marked escape route may, due to the location of the fire, prove to be impossible, in which case known arrangements may guide people in a wrong direction and even towards the fire.

SUMMARY AND OBJECTS OF THE INVENTION

The object of the present invention is to realize a completely novel arrangement for a signaling, guiding and alerting system in evacuation situations, by means of which arrangement the drawbacks of known arrangements can be avoided. Another object of the present invention is to realize a system by means of which people in a fire situation can be guided away from the fire area as efficiently as possible.

The method according to the invention is mainly characterized in that in the method, in the first step, sequentially arranged light sources (40), which are most advantageously arranged in a light source string or at least as part of a light source string, are activated on the basis of a signal received from a fire detector, to a first mode, in which first mode the sequentially arranged light sources are used for indicating the direction of the escape route, and/or to a second mode, in which the light sources are switched to emit continuous light.

The arrangement according to the invention is mainly characterized in that the light sources, which are most advantageously arranged in a light source string, or at least as part of a light source string, are arranged to be switched to a first mode, i.e. a dynamic mode, in which they are used for indicating the direction of an escape route, and/or to a second mode, where the light sources are switched to emit continuous light, on the basis of the detection signal of a fire detector.

The arrangement according to the invention has several remarkable advantages. By means of the method and arrangement according to the invention, in a hazardous situation people can be efficiently guided out along escape routes, as the light sources are activated, and by means of their first mode, the dynamic mode, the light is used for guiding people towards the escape routes. By adjusting a light source string or part thereof, located in the vicinity of the fire spot, to a second mode, a static mode, where the illumination given by the light source string or part thereof is increased by switching on several light sources, typically all light sources provided at said spot, there is achieved a maximal light as the smoke is at densest. At the same time, the light source strings or parts thereof that are in the first mode, adjacent to the light source string that is in the static mode, guide people away from the light source string that is in the static mode, i.e. away from the vicinity of the fire. Now people are prevented or at least efficiently instructed from going in the wrong direction, towards the fire. By setting the light sources in a string that is arranged in the lower part of the space, in the wall or preferably in the floor, there is achieved an easy installation and a good attention value. By adjusting the mode of the light source string, it is possible to change for instance the color of the light from the light source, such as the color of the LED light.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1-10 show a simplified graph illustrating a system according to an embodiment of the invention, viewed from above in the different steps of the operational functions, where FIG. 1 is a graph showing an embodiment of the system viewed from above.

DETAILED DESCRIPTION OF THE PREFERRED EMBODIMENTS

In the invention, there are typically used sequentially arranged light sources 40 (FIG. 1a), which are controlled in a way known as such, so that the sequentially arranged light sources form a light source string 4, which is installed in spaces that people use when exiting from a hazardous situation. These are for instance corridor spaces in hotels or other buildings or vessels, such as passenger ships. The light source string 4 or at least part thereof can be set in at least two modes. The first is a dynamic mode, where the light sources 40 are switched on and off, so that there is created an illusion of movement. Now a person who sees the illusion of movement created by means of the light sources 40 of the light source string is guided towards the proceeding direction of the "movement" of the light source string 4. Typically the illusion of movement is achieved by controlling the light sources 40 in groups, where the movement is created by switching on the next light source and respectively by switching off the previous one. The light sources are arranged/coupled in a string, particularly in a conductor string 41, where they are controlled in the way described above. Now there is achieved an illusion of movement by the light sources, i.e. by "trickling" the light, and said illusion of movement is created at least along part of the length of the light source string 4, but typically along the whole length of the light source string. In the first mode, i.e. the dynamic mode, the "moving" light of the light string 4 is typically created for example by groups of 3 light sources, where the light of one light source is switched on, and the rest of the two are switched off. The illusion of movement is obtained as the next light is switched on and the previous light is switched off. The light source strings 4 can be connected in succession, so that the illusion of movement can continue from one light source string to the next. When desired, the rate of the movement created by light can be adjusted, and the direction of the movement can also be changed.

The light source string 4 or at least part of it also has a second mode, a static mode, where the light sources 40 of the string or part of the string are illuminated. Typically the static, brighter illumination is created so that all light sources 40 of at least one light source string 4 or at least part of the light source string are switched to be illuminated simultaneously. The light source string can be controlled to change modes between the dynamic and the static mode. The light source string can also have other modes. In a preferred embodiment, the color of the light emitted by the light source can be changed.

FIG. 1a illustrates a light source string 4. The light sources 40 can advantageously be for example light emitting diodes, LED light sources, which are fastened to a conductor string 41, for instance to a conductor string described in the patent publication FI 108106 B. The light sources are typically controlled by a control system 10, so that the control system receives signals from one or several fire detectors 3 connected thereto.

In case of fire, many buildings or vessels are provided with fire detectors 3. There are many different types of fire detectors. The regular types are smoke detectors, which send a signal to the control system when there is generated smoke that is typical of a fire. On the other hand, there are known temperature-sensitive detectors. In many cases, the employed fire detectors 3 are provided with both features, i.e. smoke detection and heat detection. This type of fire detector gives a signal of both smoke generation and of a temperature that surpasses a given predetermined value. In case of a fire, smoke is spread in a wide area, in which case the smoke detectors of several different fire detectors typically give an alarm, i.e. a signal. In a fire situation, a heat detector in turn only reacts when the fire has approached near the detector, i.e. it reacts to the fire in way that is more location-specific than with a smoke detector. There are also known flame detectors that give a signal after detecting a flame.

In a preferred embodiment, the system according to the invention is arranged to function so that a light source string 4 or at least part thereof is activated in a situation where two or more fire detection signals have been received from a detector 3 arranged in a light source string 4 or part thereof. Now the activated light source string 4 is arranged to be first switched to a dynamic mode and to point in a suitable direction of an escape route 5, for example by changing the mode of the light sources 40, for instance by "trickling" the light.

FIGS. 1-10 illustrate in a simplified graph of the operation of a signaling, guiding and alert light system according to an embodiment of the invention, in connection with a cabin fire aboard a vessel. The cabins 1 and the corridor spaces 2 are provided with fire detectors 3, which include both smoke detection and heat detection functions. The corridor spaces 2 are provided with light source strings 4, which are represented in the activated mode in FIGS. 5-10. FIGS. 5-10 represent several light source strings 4 that can be controlled either separately and/or as a group. The light source strings 4 are typically arranged in succession, for example in the lower part of the corridor space 2, typically on the floor. The light source string 4 can be fastened directly onto the mounting surface, or embedded therein. The light sources 40 can also be separately fastened to the mounting surface.

Figure 1:
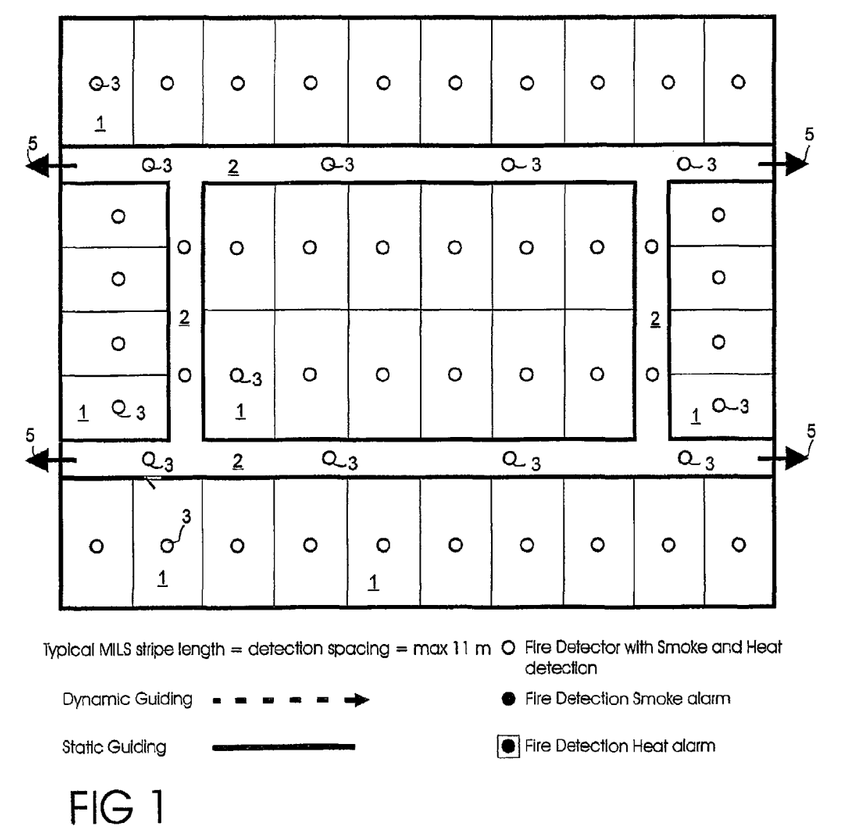
Figure 1A:
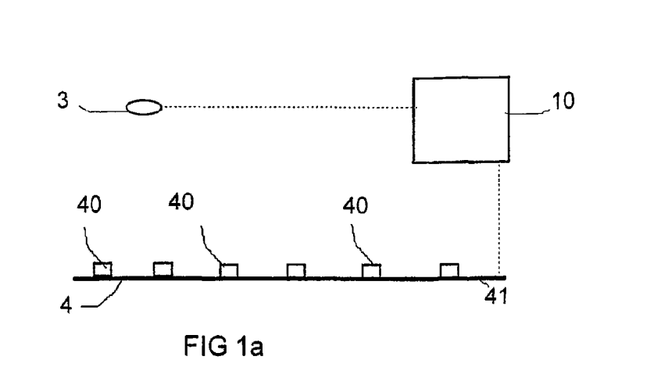
FIG. 1*a* is a simplified illustration of a detail of a system according to the invention.

Consequently, in FIG. 1, there is represented a part of the cabin department of the vessel, comprising a large number of adjacent cabins 1 and corridor spaces 2 of the cabin department. In the embodiment illustrated in the drawing, each cabin is provided with a fire detector 3. Respectively, the corridor spaces are provided with fire detectors 3 spaced at suitable intervals. There are four escape routes 5 from the cabin department, and the corridor spaces lead to said routes. The drawing depicts two elongate corridor spaces, as well as transversal corridor spaces arranged at regular intervals in perpendicular to said corridor spaces. The cabin department could also be for example part of a hotel or other building, for instance an office building, in which case the cabins would be room spaces.

Figure 2:
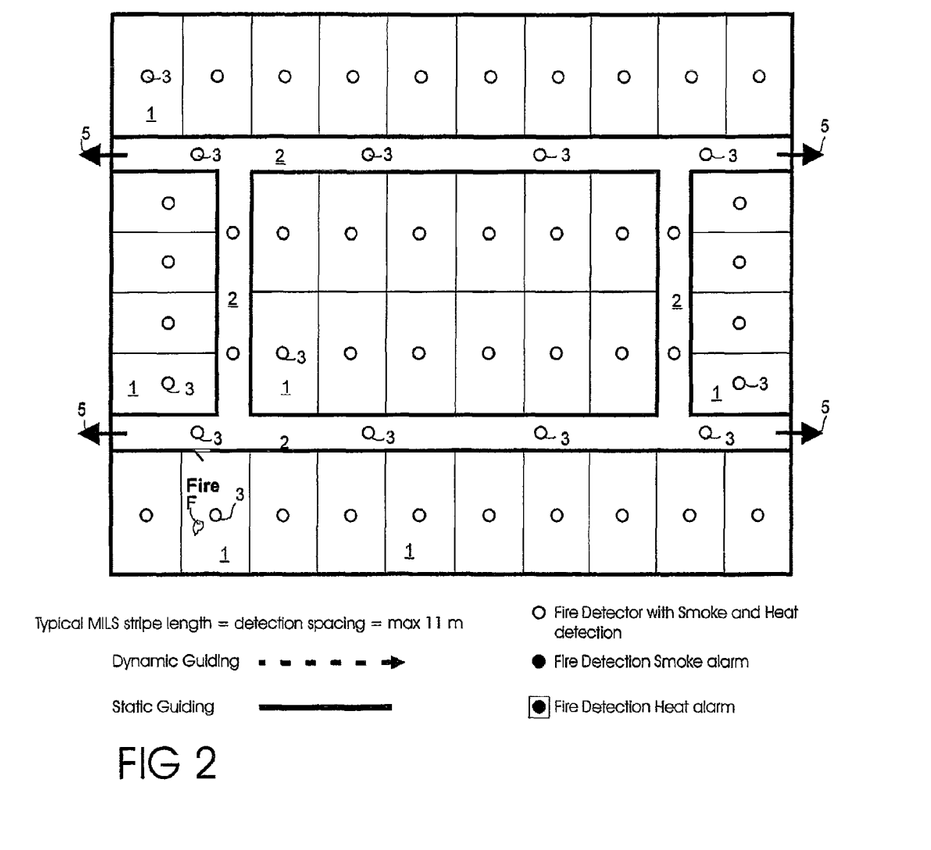
FIG. 2 illustrates the embodiment of FIG. 1 in a situation where fire has started in a section of the target of application.
Figure 3:
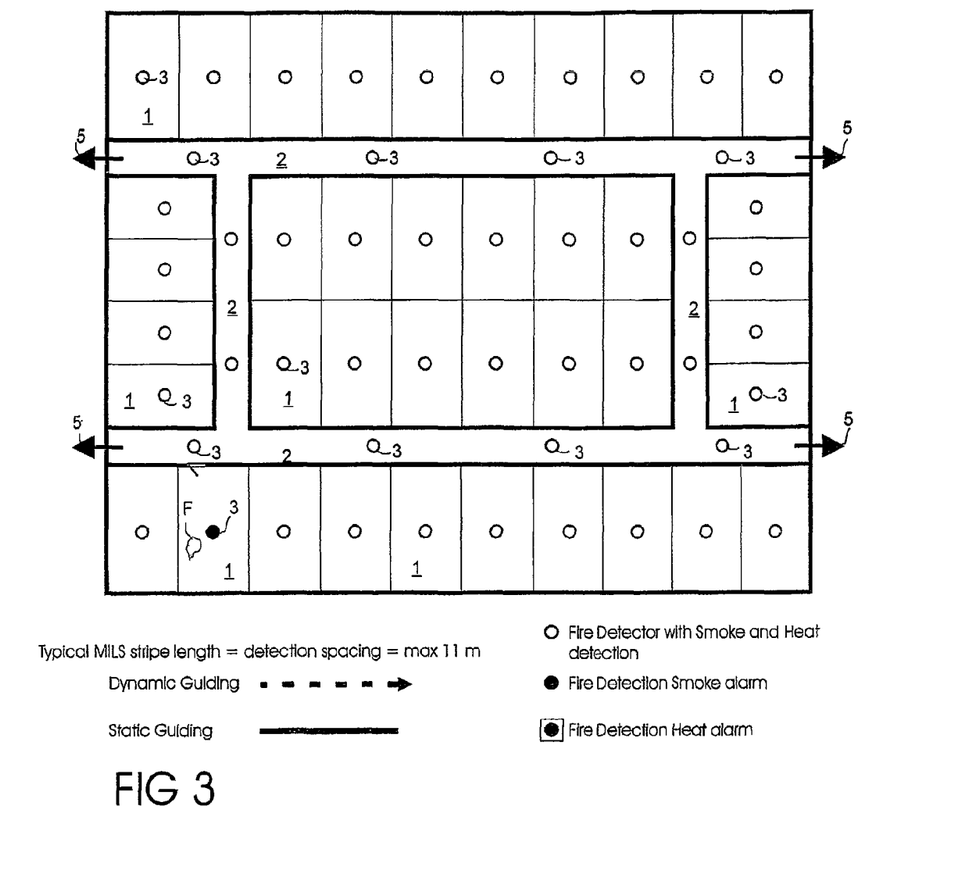
FIG. 3 is a graph illustrating a system according to an embodiment of the invention in the first step.
Figure 4:
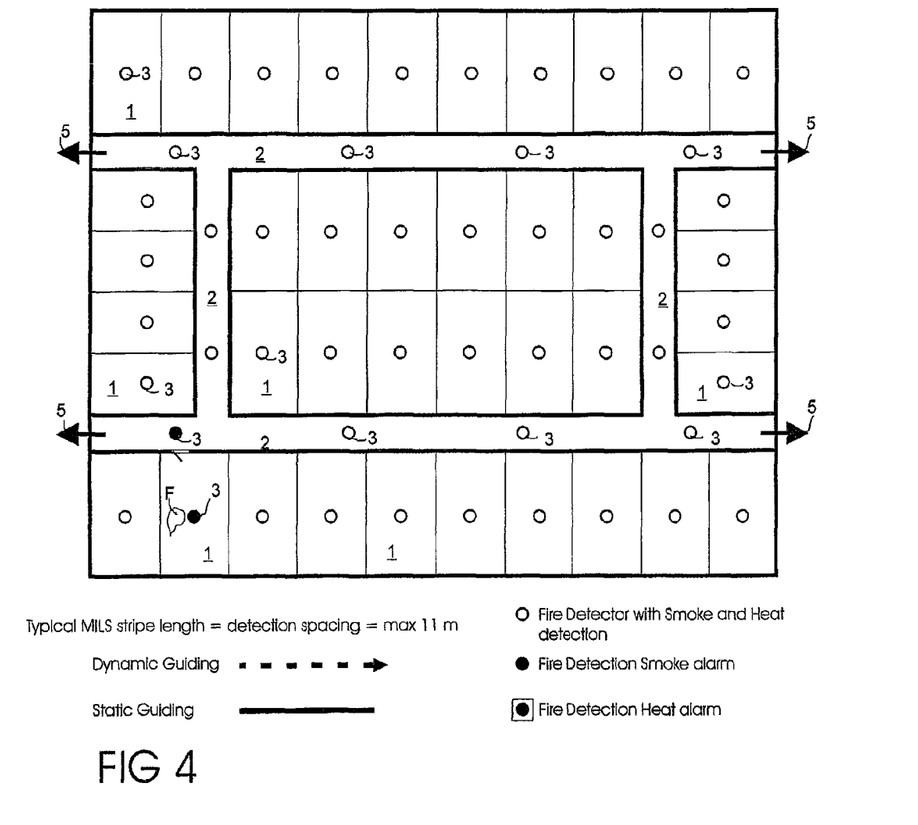
FIG. 4 is a graph illustrating a system according to an embodiment of the invention in the second step.
Figure 5:
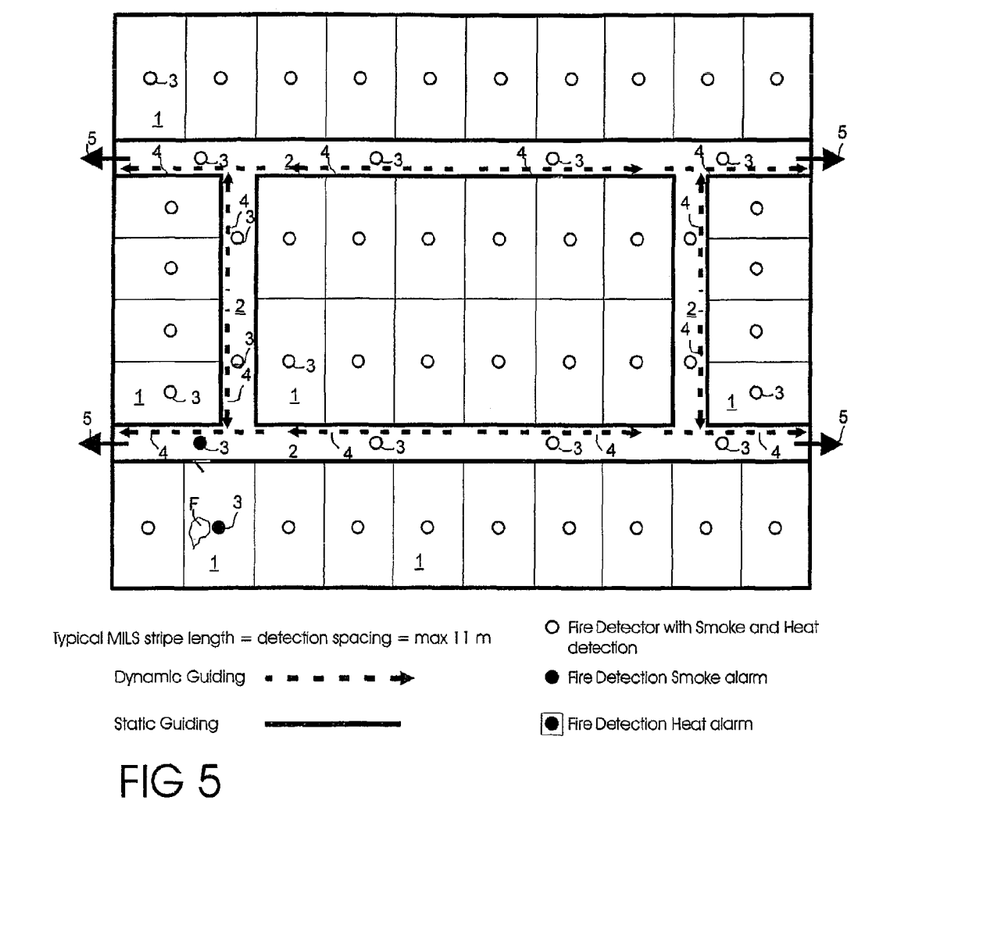
FIG. 5 is a graph illustrating a system according to an embodiment of the invention in the first mode.

FIG. 2 represents a situation where fire F has started in one of the cabins 1. In this situation, the cabin door has been left open. In FIG. 3, the smoke detector of the cabin fire detector 3 has reacted to the smoke generated by the fire and has given an alarm signal. In FIG. 4, the smoke generated by the fire has spread through the open door in the corridor space 2 in the vicinity of the cabin. Now the smoke detector of the fire detector 3 located near the cabin in the corridor space 2 has given an alarm signal. On the basis of these two signals, the light source strings 4 are switched, according to FIG. 5, to be activated to a dynamic mode, where they point to the escape routes by means of moving lights, for instance by "trickling" the lights, in a way that is programmed in advance. In FIG. 5, they point towards the escape routes 5. In the drawing, the light source strings 4 are represented in a simplified form, so that in the picture of the light source string 4, an arrow points to the direction shown by the light source string 4 in the first mode, i.e. the dynamic mode. In the embodiment of FIG. 5, each of the elongate corridor spaces, where the escape routes 5 are located at the ends of the corridors, are provided with four light source strings 4, or the light source string comprises four sections. The transversal corridor spaces connecting the lengthwise light source strings each comprise two light source strings 4, or the light source string comprises two sections. In the embodiment of FIG. 5, the light source strings are arranged to guide people evenly towards the different escape routes 5. The guiding signal of the strings points in the opposite directions at roughly halfway of the length of the corridor spaces. Depending on the embodiment in question, the light source strings are in advance programmed to point in the desired direction as the system is activated.

Figure 6:
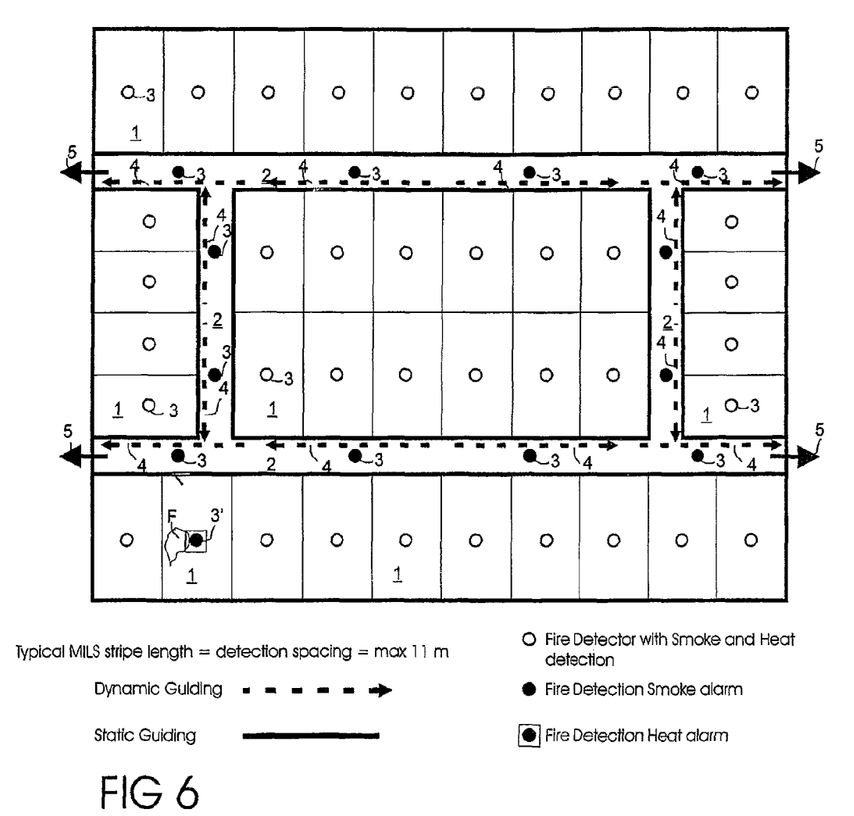
FIG. 6 is a graph illustrating a system according to an embodiment of the invention in the first mode, in a second situation.

Regrettably the fire continues and proceeds further, in which case, according to FIG. 6, the temperature in the cabins 1 has risen, so that the temperature-sensitive detector 3' of the fire detector provided in the cabin 1 has given a signal. Smoke has spread in the corridor space, and there several fire detectors 3 have given an alarm signal caused by detected smoke. The light source strings help people to find an escape route in the smoke-filled corridor space.

Figure 7:
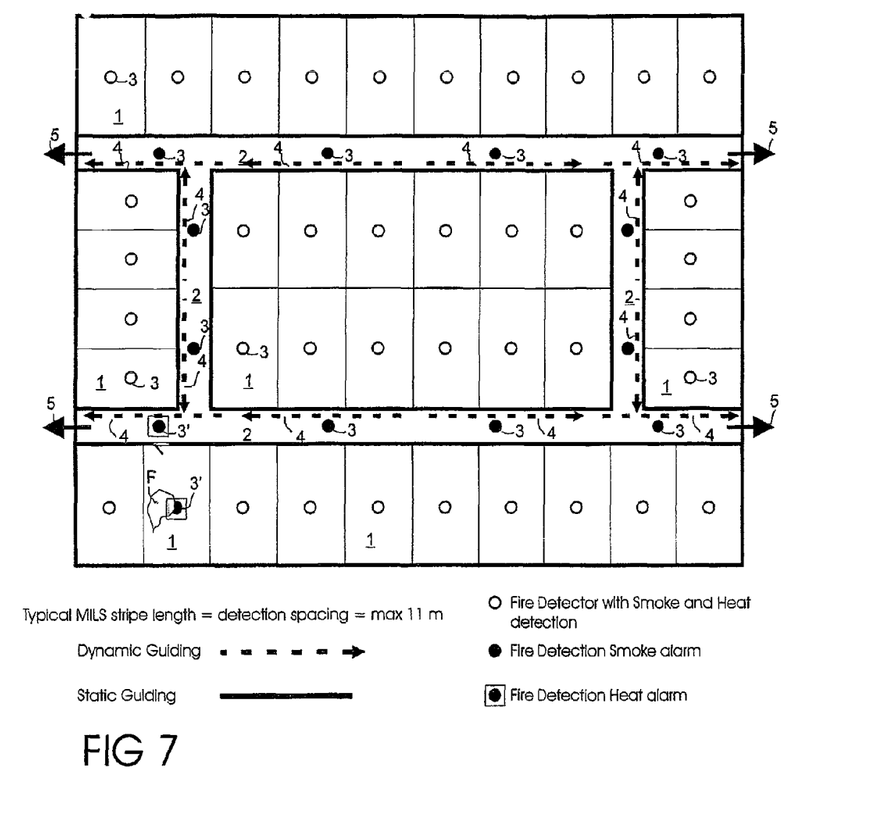
FIG. 7 is a graph illustrating a system according to an embodiment of the invention in the first mode, in a third situation.
Figure 8:
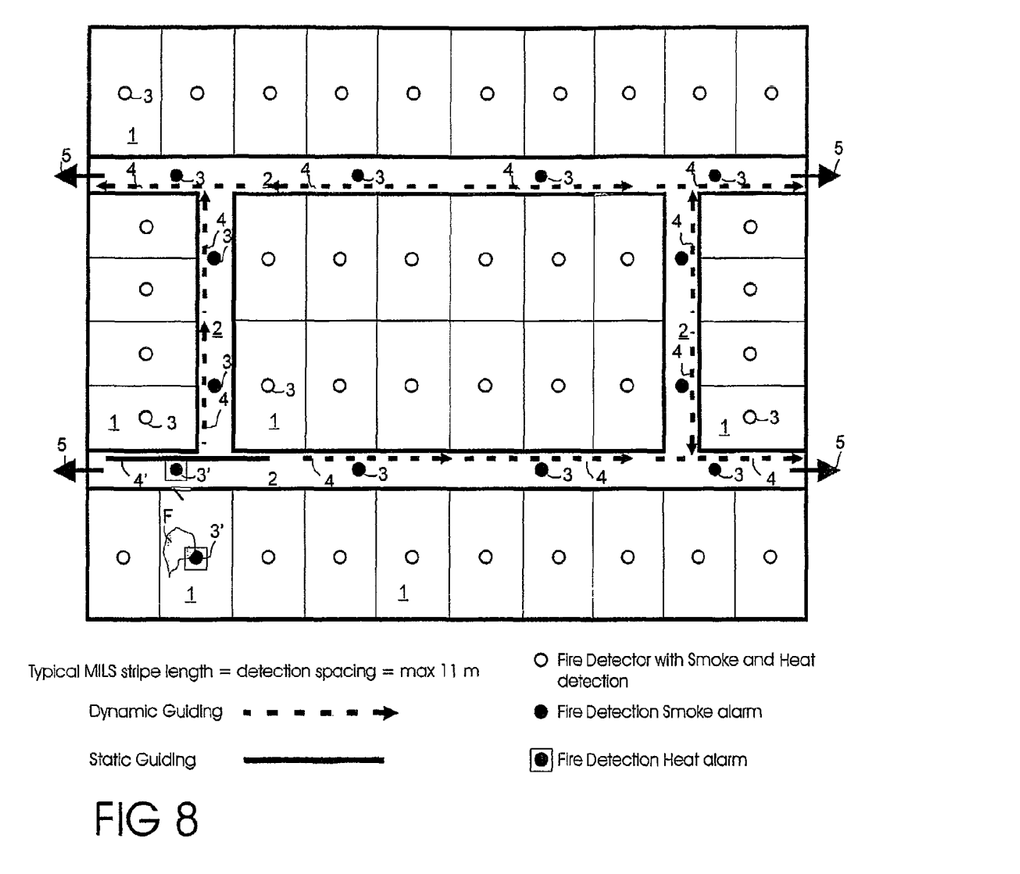
FIG. 8 is a graph illustrating a system according to an embodiment of the invention in the second mode.
Figure 9:
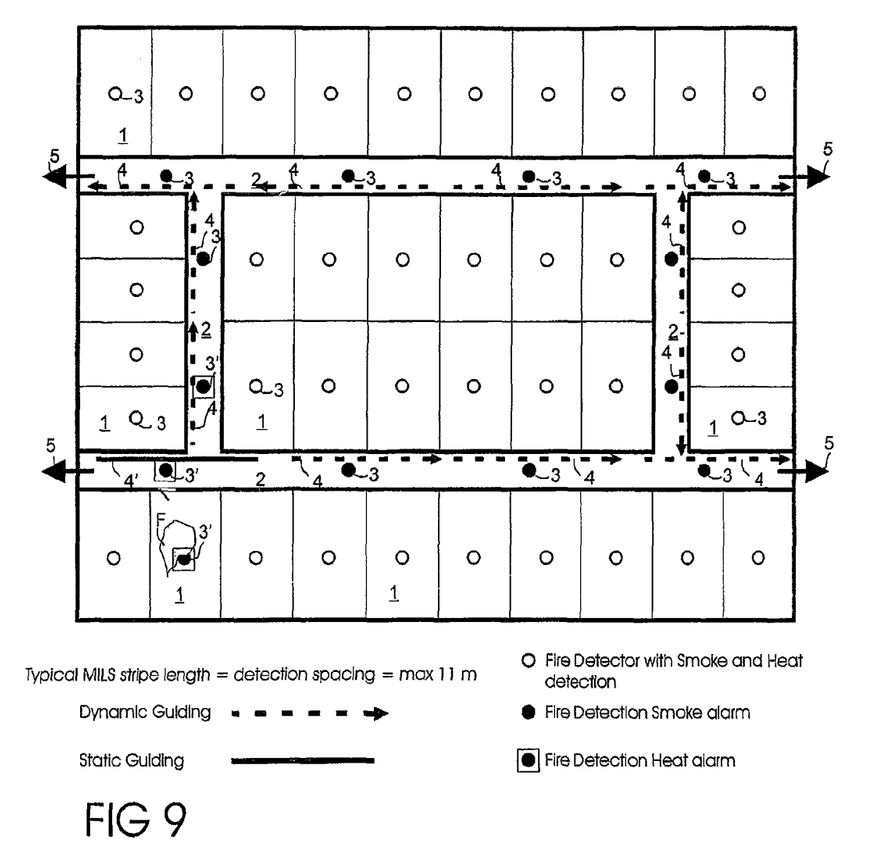
FIG. 9 is a graph illustrating a system according to an embodiment of the invention in the second mode, in a second situation.

According to FIG. 7, the temperature caused by the fire also rises outside the cabin, and the heat detector of the fire detector 3' placed in the corridor space 2 outside the cabin gives an alarm signal. Now the light source string 4' located in the corridor space 2 and allocated to the fire detector 3' is arranged to be switched to the static mode (FIG. 8), where the light is not "trickling" anymore, but the luminosity of the light source string 4 is increased by switching the light sources 40 to emit constant light. This improves visibility in the smoke-filled corridor space 2 in the vicinity of the site of fire. In addition, the light source strings 4 or light source string sections adjacent to the light source string 4' or part thereof that has been switched to the static mode are arranged to point in the exit direction, i.e. away from the site of fire or at least away from the light source string 4' that is in the static mode.

If the fire continues further, the heat detectors of possibly even several corridor space fire detectors 3' (FIG. 9) react, and on the basis of the signals given by them, more light source strings 4' or at least parts thereof are switched to the static mode (FIG. 10), where at least the luminosity of the light emitted by them is increased by switching at least the major part of the light sources on.

Figure 10:
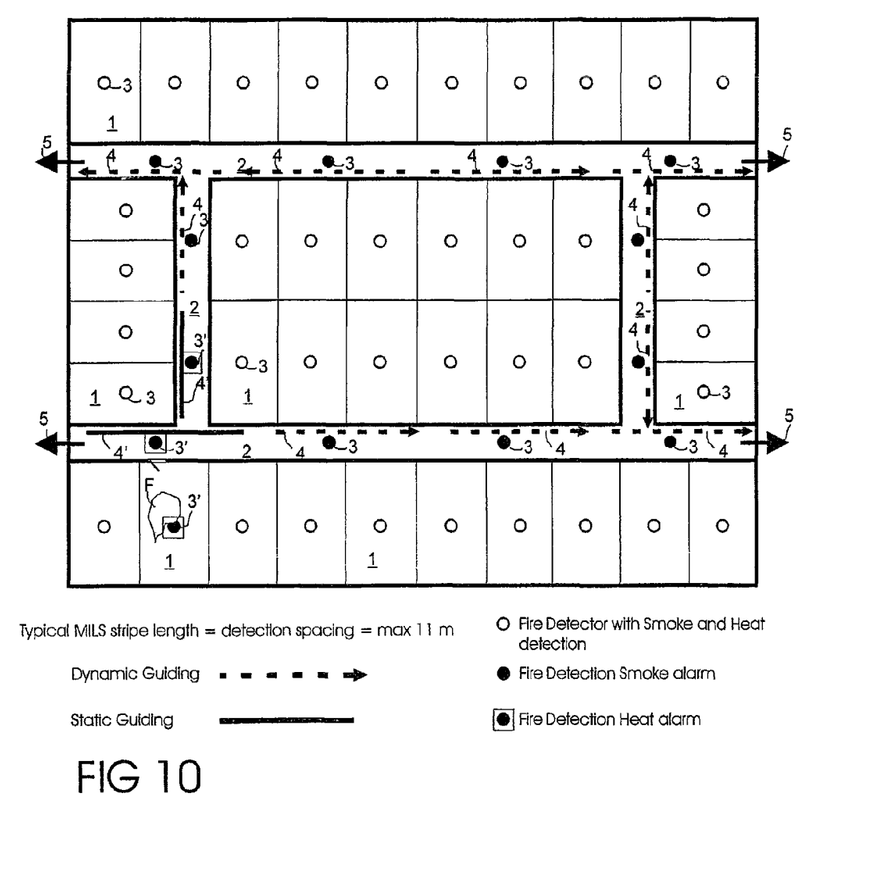
FIG. 10 is a graph illustrating a system according to an embodiment of the invention in the second mode, in a third situation.

Depending on the properties of the light source 40, for example the color of the light emitted by the light source can be changed, when the light source string 4 is switched to the static mode. FIG. 10 represents two light source strings 4' in the static mode. With respect to these, the adjacent light source strings 4 are in the dynamic mode, indicating the direction of the escape route.

In the embodiment of the drawings, a light source string 4 comprises sequentially arranged light sources 40. The light source string 4 can be divided into several sections, at least in length. The light sources in the light source string can be any suitable light sources, such as light emitting diodes, LED lights.

In the static mode the light sources 40, typically all light sources in the light source string or part thereof, are in a mode where the light sources emit light. In color, the light can be different in the different modes of the light source string.

Typically the control of the light sources 40 is arranged according to the signals received from the fire detectors 3. The control system or the control device 10 controls the light sources 40 in the light source string 4. When necessary, the system can also be activated manually, and likewise deactivated.

Thus the invention relates to a method for controlling guiding, signal or alert lights, particularly the signal lights of emergency escape routes in a fire situation, in which method there are controlled sequentially arranged light sources, such as LED light sources. In the first step of the method, there are activated sequentially arranged light sources 40, which are most advantageously arranged as a light source string 4 or at least part of a light source string, on the basis of a signal received from a fire detector 3, to a first mode, in which first mode the sequentially arranged light sources are used for indicating the direction of an escape route, and/or to a second mode, where the light sources 40 are switched to emit continuous light.

According to a preferred embodiment, in the second step the light sources 40 of the light source string 4, 4' or at least part thereof are switched from the first mode to a second mode, a static mode, where the light sources 40 are switched to emit continuous light, on the basis of a heat detection or flame detection signal received from the fire detector 3.

According to a preferred embodiment of the method, in order to activate the sequentially arranged light sources 40, i.e. the light source string 4, to a first mode there are needed at least two fire detection signals from the fire detectors, such as two smoke detection signals from different fire detectors 3 or a smoke detection signal and a heat or flame detection signal from one and the same fire detector.

According to a preferred embodiment, sequentially arranged light sources, i.e. a light source string 4, 4' or at least part thereof, are switched to a second mode, a static mode, on the basis of a fire detection signal, particularly heat or flame detection signal, received from a fire detector 3 connected thereto.

According to a preferred embodiment, a light source string 4, 4' or at least part thereof is switched from the first mode to a second mode on the basis of a fire detection signal received from at least one fire detector connected thereto, said fire detector 3' being arranged in the same space with the light source string, particularly in a corridor space 2, advantageously in a section where the light source string 4, 4' is located, or in the vicinity thereof.

According to a preferred embodiment, at least one fire detection signal is a heat detection signal, particularly from the corridor space 2, from the fire detector 3'.

According to a preferred embodiment, the pointing direction of the light source string 4 adjacent to the light source string 4' switched to the second mode, the static mode, said light source string 4 being preferably switched to the first mode, i.e. the dynamic mode, is adjusted to point away from the light source string 4' switched to the static mode.

According to a preferred embodiment, in targets with several escape routes 5, the sequentially arranged light sources, i.e. light source strings 4, are in the first mode arranged to point to the nearest escape route and/or arranged to divide the people present in the target locations evenly between the different escape routes 5.

According to a preferred embodiment, the light source string 4 or at least part of the light source string is connected to receive a control signal from one or several fire detectors.

According to a preferred embodiment, the light sources employed in the method are LED light sources. The light sources can have several different modes. For example, it can be assumed that in the first, i.e. the dynamic mode, the light source has a first color that it emits. In the second mode, i.e. the static mode, the light source has a second color that it emits. In the second mode, the luminosity emitted by the light source string is higher than in the first mode, because all light sources of the light source string 4, or part thereof, are advantageously switched to emit light in the second mode.

The invention also relates to a signaling, guiding or alert light system, particularly to a signal light system for emergency escape routes, said system comprising sequentially arranged light sources, such as LED light sources, and fire detectors 3. According to a preferred embodiment, the light sources 40, which are most advantageously arranged as a light source string 4 or at least as part of a light source string, are arranged to be switched to a first mode, i.e. a dynamic mode, where they are used for indicating the direction of the escape route, and/or to a second mode, where the light sources 40 are switched to emit continuous light, on the basis of a fire detection signal received from a fire detector 3.

According to a preferred embodiment, sequentially arranged light sources, which are most advantageously arranged as a light source string 4 or at least as part of a light source string, also have at least one second mode, a static mode, where the light sources 40 are switched to emit continuous light, on the basis of a heat detection or flame detection signal received from a fire detector 3.

According to a preferred embodiment, sequentially arranged light sources, i.e. a light source string 4, is arranged to be activated to the first mode, the dynamic mode, on the basis of at least two fire detection signals, such as smoke detection signals received from two different fire detectors 3, or on the basis of smoke and heat detection or flame detection signals received from one and the same fire detector.

According to a preferred embodiment, sequentially arranged light sources, i.e. a light source string 4, 4' or at least part thereof is arranged to be switched to the second mode, the static mode, on the basis of a least one fire detection signal, particularly heat or flame detection signal, received from a fire detector 3 connected thereto.

According to a preferred embodiment, a light source string 4, 4' or at least part thereof is arranged to be switched from the first mode to a second mode on the basis of at least one fire detection signal received from a fire detector 3 connected thereto, said fire detector 3' being arranged in the same space with the light source string 4, particularly in a corridor space 2, preferably in a section where the light source string 4, 4' is located, or in the vicinity thereof.

According to a preferred embodiment, at least one fire detection signal is a heat or flame detection signal received from a fire detector 3' arranged in the corridor space 2.

According to a preferred embodiment, the fire detector 3 comprises means for giving a smoke and/or heat detection signal or a flame detection signal.

According to a preferred embodiment, the system is arranged to be connected to buildings, such as hotels, office buildings, residential buildings or the like, or to vessels, such as passenger ships.

According to a preferred embodiment, the length of a section of sequentially arranged light sources, such as the length of the light source string 4 or part thereof essentially corresponds to the distance left between separate fire detectors 3, particularly in the corridor space 2.

According to a preferred embodiment, adjacent to a light source string 4 or part thereof or in the vicinity thereof, there is arranged a fire detector 3, on the basis of the heat detection or flame detection signal whereof the light source string 4 is arranged to be switched from the dynamic mode to the static mode.

The arrangement according to the invention is extremely advantageous and well suited to be used for example in hotels or passenger ships, as the signaling and guiding illumination for emergency escape routes, and as a system that speeds up evacuation procedures.

Typically light source strings can also be used in other purposes than signaling and guiding passengers and/or pointing escape routes for example in hazardous situations.

The light source string according to the invention can be based for example on a conductor string provided with LED light sources described in the patent publication FI 108106 B.

The invention also relates to a device for a signaling, guiding or alert light system, particularly in a signal light system for emergency escape routes, said device comprising sequentially arranged light sources, such as LED light sources. The light sources 40 are arranged as a light source string 4 or at least as part of a light source string, and the device comprises at least one fire detector 3, including both a smoke detector and a heat or flame detector, which are connected directly or through a control system 10 to the light source string or part thereof.

According to another embodiment, the invention relates to a device for a signaling, guiding or alert light system, particularly in a signal light system for emergency escape routes, said device comprising sequentially arranged light sources, such as LED light sources. The light sources 40 are arranged as a light source string 4 or at least as part thereof, and the device comprises at least one fire detector 3, including both a smoke detector and a heat or flame detector, which are connected directly or through a control system 10 to the light source string or part thereof, so that the light source string 4 or part thereof is provided with a fire detector allocated to it.

According to yet another embodiment, the invention relates to a device for a signaling, guiding or alert light system, particularly in a signal light system for emergency escape routes, said device comprising sequentially arranged light sources, such as LED light sources. The light sources 40 are arranged as a light source string 4 or at least as part thereof, and the device comprises at least one fire detector 3, including both a smoke detector and a heat detector, which are connected directly or through a control system 10 to the light source string or part thereof, so that the fire detector 3 has one light source string 4 or part thereof allocated to it.

The length of the light source string can be adjusted according to the needs of the target of application. In a preferred embodiment, the length of one light source string is adjusted to be the maximum operational diameter of the fire detector (or the maximum distance between adjacent fire detectors). In an embodiment, the distance between the fire detectors can be of the order 5-15 meters, advantageously 7-13 meters, preferably 9-11 meters. Now the string length is arranged respectively. Each fire detector 3 located in the same space with a light source string 4 and affecting its modes is typically, but not necessarily, arranged in the center region of the light source string 4, with respect to its lengthwise direction.

The light sources can also have other modes than the ones described above. For example, in a situation with disturbance or confusion, the light sources can be arranged to illuminate, in which case the light source string does not guide people, but the luminosity is maximal.

For a man skilled in the art, it is obvious that the invention is not restricted to the above described embodiments only, but it can be modified within the scope of the appended claims. Characteristic features possibly presented as connected to other such features in the specification can, when necessary, also be used individually.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for controlling guiding, signal or alert lights in a structure having multiple escape routes, each of the escape routes leading to a corresponding exit of the structure,
   each of the escape routes having a light source string having multiple light sources showing a way to the corresponding exit,
   the method comprising:
   sending a fire detection signal from one or more fire detectors to a control device,
   transmitting a first signal from the control device to the light source string, thereby enabling the light sources sequentially arranged on at least a portion of the light source string to operate in a first mode, and
   transmitting a second signal from the control device to the light source string, thereby enabling the light sources sequentially arranged on the at least a portion of the light source string to operate in a second mode,
   the first mode being a dynamic mode indicating a guiding direction of movement by switching on a next one of the light sources sequentially arranged on the at least a portion of the light source string, and by switching off a preceding one of the light sources, and thereafter by repeating the on and off switching of the next and the preceding pairs of light sources along a length of the at least a portion of the light source string,
   the second mode being a static mode indicating that the guiding direction of movement is away from the at least a portion of the light source string by switching each of the light sources thereon to a state of emitting continuous light,
   the method further comprising:
   transmitting the first signal from the control device to the light source string of each of the multiple escape routes,
   switching the light sources in the light source string of each of the multiple escape routes to the first mode, and
   providing in the structure an indication of a specific one of the multiple escape routes that leads to the corresponding exit.

2. The method according to claim 1, further comprising:
   switching each of the light sources to the second mode based on detecting heat or receiving a flame detection signal from the one or more fire detectors.

3. The method according to claim 1, further comprising:
   switching each of the light sources to the first mode based on detecting at least two fire detection signals from two separate ones of the fire detectors, by detecting two smoke detection signals from the two separate fire detectors, or by detecting both a smoke detection signal and a heat or a flame detection signal from one of the two separate fire detectors.

4. The method according to claim 1, further comprising:
   switching each of the light sources to the second mode based on detecting a fire detection signal received from the one or more fire detectors.

5. The method according to claim 4, further comprising:
   providing the one or more fire detectors in a corridor space, and
   receiving at least one fire detection signal from the one or more fire detectors in the corridor space.

6. The method according to claim 1, further comprising:
   switching the at least a portion of the light source string from the first mode to the second mode based on receiving a fire detection signal from the one or more fire detectors,
   wherein the one or more fire detectors are arranged together with the light source string, the light source string being located in a corridor space or in a vicinity thereof.

7. The method according to claim 1, further comprising:
   providing the light source string with first and second portions which are adjacent to each other,
   switching both of the first and second portions to the first mode, and
   when the second portion receives the second signal from the control device, switching the second portion to the second mode, and thereafter
   the first portion remaining in the first mode and pointing away from the second portion which has been switched to the second mode.

8. The method according to claim 1, further comprising:
   switching the light source string or the at least a portion thereof to receive a control signal from the one or more fire detectors.

9. The method according to claim 1, the method further comprising:
   providing LED light sources as the light sources.

10. The method according to claim 1, further comprising:
    changing a color emitted by the light sources of the light source string when the light source string is changed between the first mode and the second mode.

11. A signaling, guiding or alert light system in a structure having multiple escape routes, each of the escape routes leading to a corresponding exit of the structure, the system comprising:
    a control device,
    light sources sequentially arranged in at least a portion of a light source string in each of the escape routes, and
    one or more fire detectors adapted to send a fire detection signal to the control device,
    the control device being adapted to transmit a first signal to the light source string to enable the light sources sequentially arranged on at least a portion of the light source string to operate in a first mode, and to transmit a second signal from the control device to the light source string to enable the light sources sequentially arranged on the at least a portion of the light source string to operate in a second mode,
    the first mode being a dynamic mode indicating a guiding direction of movement by switching on a next one of the light sources sequentially arranged on the at least a portion of the light source string, and by switching off a preceding one of the light sources, and thereafter by repeating the on and off switching of the next and the preceding pairs of light sources along a length of the at least a portion of the light source string, the second mode being a static mode indicating that the guiding direction of movement is away from the at least a portion of the light source string by switching each of the light sources thereon to a state of emitting continuous light, wherein the control device is adapted to transmit the first signal to the light source string of each of the multiple escape routes, in order to switch the light sources in the light source string of each of the multiple escape routes to the first mode, and to provide in the structure an indication of a specific one of the multiple escape routes that leads to the corresponding exit.

12. The system according to claim 11, further comprising:
two separate ones of the fire detectors, each being adapted to send a smoke detection signal, and a heat or a flame detection signal to the control device, in order to switch each of the light sources to the first mode based on signals from either of both of the two separate fire detectors.

13. The system according to claim 12, wherein the one or more fire detectors are arranged adjacent to the light source string, and
the control device is adapted to switch the light source string from the dynamic mode to the static mode based on a heat or a flame detection signal received from the one or more fire detectors.

14. The system according to claim 11, wherein each of the light sources is adapted to be switched to the second mode based on the fire detection signal received from the one or more fire detectors.

15. The system according to claim 11, wherein the control device is adapted to switch the at least a portion of the light source string from the first mode to the second mode upon receiving the fire detection signal from the one or more fire detectors,
wherein the one or more fire detectors are arranged together with the light source string, the light source string being located in a corridor space, or in a in the vicinity thereof.

16. The system according to claim 11, wherein the one or more fire detectors are located in a corridor space of the structure.

17. The system according to claim 11, wherein the one or more fire detectors includes means for giving a smoke detection signal, and/or a heat detection signal, and/or a flame detection signal.

18. The system according to claim 11, wherein the structure in which the system is arranged include hotels, office buildings, residential buildings and passenger ships.

19. The system according to claim 11, wherein a length of the portion of the light source string corresponds to a distance between two of the fire detectors in a corridor space.

20. The system according to claim 11, wherein the one or more fire detectors includes both a smoke detector and a heat detector, which are connected directly to the light source string.

21. The system according to claim 11, wherein the system is adapted to change a color emitted by the light sources of the light source string when the light source string is changed between the first mode and the second mode.

* * * * *